United States Patent [19]

Crain

[11] Patent Number: 4,669,774
[45] Date of Patent: Jun. 2, 1987

[54] CONVERTIBLE BOOT POSITIONING AND SECURING ARRANGEMENT

[75] Inventor: John E. Crain, Birmingham, Mich.

[73] Assignee: Chrysler Motors Corporation, Highland Park, Mich.

[21] Appl. No.: 838,841

[22] Filed: Mar. 12, 1986

[51] Int. Cl.[4] .............................................. B60J 7/20
[52] U.S. Cl. .................................................... 296/136
[58] Field of Search ................ 296/136; 292/DIG. 1, 292/137, 163

[56] References Cited

U.S. PATENT DOCUMENTS

| | | | |
|---|---|---|---|
| 3,154,341 | 10/1964 | Booth | 296/136 |
| 3,891,252 | 6/1975 | Lehmann | 296/136 |
| 4,512,606 | 4/1985 | Trostle | 296/136 |
| 4,600,233 | 7/1986 | Boydston | 296/136 |

Primary Examiner—Robert R. Song
Attorney, Agent, or Firm—Gerald P. Dundas

[57] ABSTRACT

A boot for overlying the folded top of a convertible automobile which is easily and quickly installable on the vehicle. The boot is provided with a bayonet type prong at each rearward corner of the boot which is inserted into a locking aperture in the vehicle body. Insertion of the bayonet indexes and secures the boot to the vehicle.

5 Claims, 2 Drawing Figures

CONVERTIBLE BOOT POSITIONING AND SECURING ARRANGEMENT

FIELD OF THE INVENTION

This invention relates to a convertible top boot construction used to enclose a folding top storing well formed in the vehicle body. The boot construction employs a unique means for easily detachably securing the boot to the vehicle body.

BACKGROUND OF THE INVENTION

Convertible automobiles generally have a well adjacent the rear seat or storage area for receiving the top when it is lowered. A cover or "boot" for enclosing this well and giving a "finished" appearance to the vehicle has long been provided. However, boot usage is very often avoided due to difficulty in securing the boot to the vehicle. Thus, for many years, button type snaps placed about the periphery of the boot were used in conjunction with cooperating snaps located on the body of the vehicle. Body panel tolerance variations, however, frequently resulted in alignment problems which caused difficulties in attaching the boot to the vehicle.

The seriousness of the boot attachment problem may be appreciated by reference to the patent art. Thus, U.S. Pat. No. 2,664,309 discloses a snap fastener attachment arrangement whose principal advantage over the prior art button fastener is that it is concealed as opposed to the visible button system. However, the patent describes that a plurality of snap fasteners must be used, and this presents the same alignment problem as found with the button fastener.

In a similar vane, U.S. Pat. Nos. 3,222,203; 3,223,446 and 3,237,982 each relate to convertible boot securing arrangements for attaching the boot to the vehicle. Again, however, each of these patented arrangement involved a plurality of individual attachment devices located about the periphery of the boot. This requires substantial individual effort in manipulating each fastener and also does not eliminate alignment difficulties which frequently arise during vehicle manufacture or usage.

SUMMARY OF THE INVENTION

The present invention provides for a unique fastening arrangement for quick and easy attachment of the boot to the vehicle body. The arrangement makes the use of bayonet or prongs secured to each of the two outboard rear corners of the boot such that the bayonet projects outwardly from the boot. The bayonet projections or tips are insertable into apertures located in the body flange adjacent a wall of the well opening or in a molding located adjacent the well opening thereby locking the boot to the body.

Other features and advantages of the present invention will become more fully apparent from the following detailed description of the preferred embodiment, appended claims and accompanying drawing.

DESCRIPTION OF THE DRAWING

The accompanying drawing illustrates one embodiment in accordance with the present invention wherein.

DESCRIPTION OF THE PREFERRED EMBODIMENT

Figure 1:
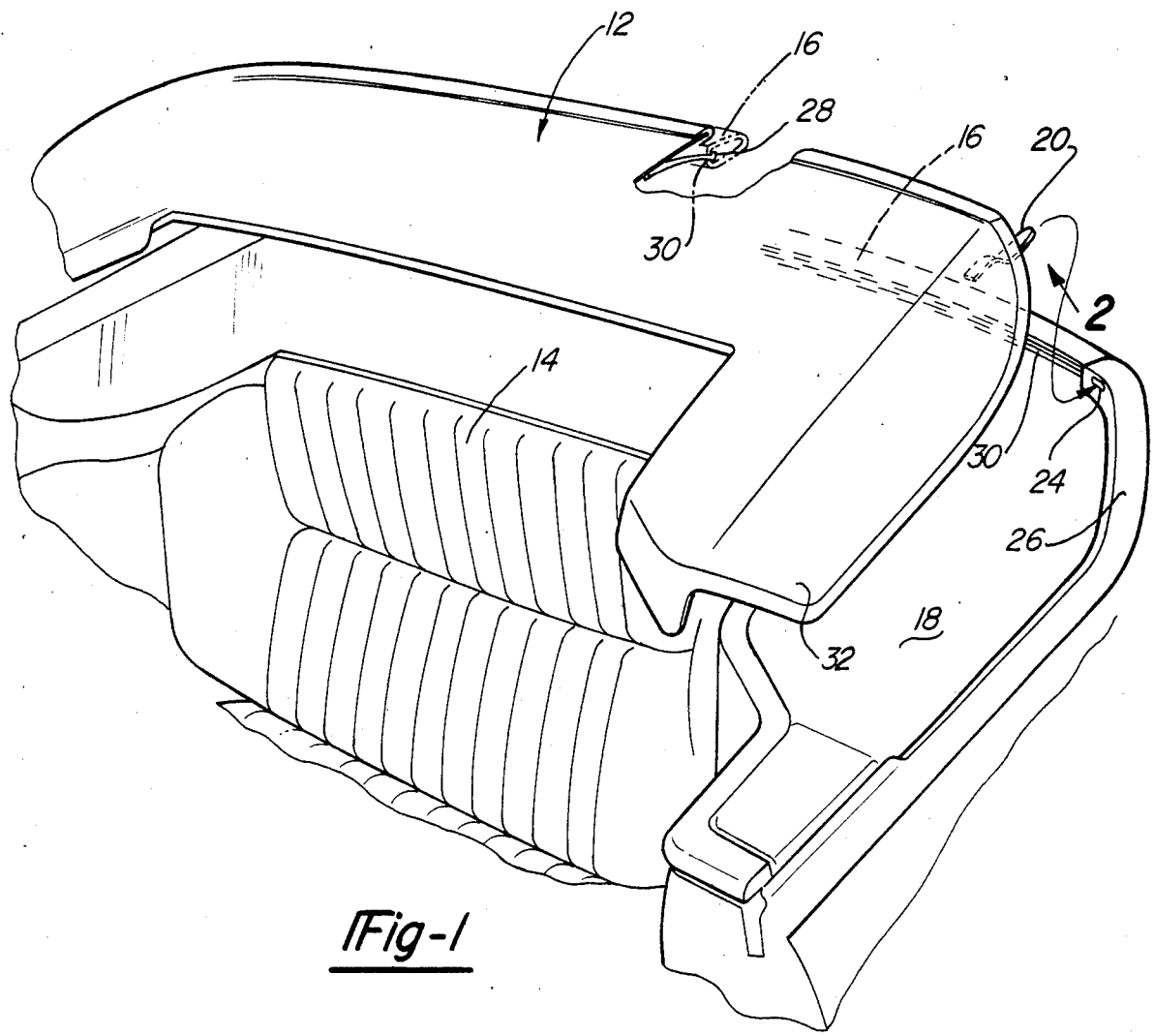
FIG. 1 is an exploded perspective view showing a boot in relation to a convertible top well portion of a vehicle.
Figure 2:
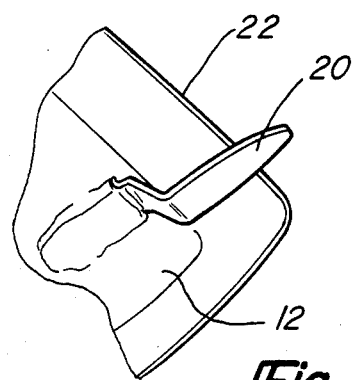
FIG. 2 is an exploded perspective view showing greater detail of the bayonet fastener of the invention.

With reference to the accompanying drawing and FIG. 1, an intermediate rear portion of a convertible type vehicle body is illustrated showing a boot 12 overlying a convertible top receiving well. The well extends transversely of the vehicle body, generally between a rear seat or storage compartment 14 and a body flange 16 and has forward laterally extending convertible top linkage storage areas 18 on each side of the rear seat 14. The boot 12 is provided to protectively enclose the top storage well and can be of the hard cover type or a flexible cover made of any suitable fabric or plastic sheet material. Generally, the boot is dimensioned to slightly overlie the periphery of the top well opening. of the boot, indicated generally at 32, may be secured to trim panel members positioned adjacent the top linkage storage area 18 by convenient snap fasteners or fasteners as disclosed in the copending patent application assigned to the assignee of the present application.

While the present invention has been disclosed in connection with the preferred embodiment thereof, it should be understood that there may be other embodiments, such as mounting of the bayonet member on the wall of the well and forming the aperture on the boot, which fall within the spirit and scope of the appended claims.

What is claimed is:

1. In a motor vehicle having a convertible top, a storage well for receiving a foldable top of the vehicle, and a boot for overlying the storage well when the top is stored therein, a boot retaining and position mechanism comprising:
    a boot for said well having peripheral edge portions overlying the well opening edges of the body;
    a well opening extending generally transversely of the vehicle body, said well opening being at least partially defined by a peripheral body flange and including a rearward flange element;
    a pair of bayonet prongs carried by said boot, said bayonet prongs being spaced from each other with each lying adjacent an outboard portion of the boot, said bayonet prongs being secured to the underside of said boot and having a tip portion extending outwardly from the boot, and
    boot locking means on said vehicle body comprising apertures positioned adjacent the rear peripheral edge of the well in registry with said bayonet tips, said bayonet tips each being receivable with an aperture for locking said boot to the vehicle body.

2. A boot retaining and positioning mechanism according to claim 1 wherein said bayonet prongs are adhesively secured to the underside of said boot.

3. A boot retaining and positioning mechanism according to claim 1 wherein the boot has a stiff plastic reinforcement piece at each of its outboard portions adjacent the side of the vehicle and wherein the bayonet prongs are secured to the boot by encapsulation in the plastic reinforcement.

4. A boot retaining and positioning mechanism according to claim 1 wherein said apertures are located in a vehicle body flange defining the rearward peripheral opening of the well.

5. A boot retaining and positioning mechanism according to claim 1 wherein a molding is secured to the vehicle body adjacent the transverse rearward well opening, said molding being provided with said apertures which receive said bayonet tips.

* * * * *